US008332824B2

(12) United States Patent
Shemenzon et al.

(10) Patent No.: US 8,332,824 B2
(45) Date of Patent: Dec. 11, 2012

(54) BINDING BETWEEN NET TECHNOLOGIES AND SQL SERVER STATEMENTS

(75) Inventors: Esther Shemenzon, Rehovot (IL); Asaf Reuveni, Petach Tikva (IL); Haim Cohen, Petah Tikva (IL); Nativ Vered, RamatGan (IL); Uri Margalit, Tel Aviv (IL); Emilia Richter, Petach Tikva (IL); Anat Dror, Modiin (IL)

(73) Assignee: Precise Software Solutions, Ltd., Or Yehuda (IL)

( * ) Notice: Subject to any disclaimer, the term of this patent is extended or adjusted under 35 U.S.C. 154(b) by 1428 days.

(21) Appl. No.: 11/769,734

(22) Filed: Jun. 28, 2007

(65) Prior Publication Data

US 2009/0006445 A1    Jan. 1, 2009

(51) Int. Cl.
*G06F 9/44* (2006.01)
(52) U.S. Cl. ........................................ 717/127
(58) Field of Classification Search ............ 717/127, 717/120
See application file for complete search history.

(56) References Cited

U.S. PATENT DOCUMENTS

| 6,792,460 | B2 * | 9/2004 | Oulu et al. | 709/224 |
|---|---|---|---|---|
| 6,823,382 | B2 * | 11/2004 | Stone | 709/224 |
| 7,382,371 | B1 * | 6/2008 | Ciabarra | 345/440 |
| 2003/0055913 | A1 * | 3/2003 | Harkin et al. | 709/218 |
| 2004/0215768 | A1 * | 10/2004 | Oulu et al. | 709/224 |
| 2005/0039171 | A1 * | 2/2005 | Avakian et al. | 717/127 |
| 2005/0254422 | A1 * | 11/2005 | Harkin et al. | 370/230 |
| 2006/0115512 | A1 * | 6/2006 | Peacock et al. | 424/422 |
| 2008/0005317 | A1 * | 1/2008 | Diao et al. | 709/224 |

OTHER PUBLICATIONS

Symantec i[3TM] for Microsoft® .NET Data Sheet: Application Performance Management, Performance management for .NET applications © 2006 pp. 1-4.
Data Sheet VERITAS™ VERITAS Indepth™ for SQL Server pp. 1-4. 2003.
VERTIAS/Indepth for SQL Server V7.1 Highlights. Retrieved from http://clientui-kb.symantec.com/resources/sites/BUSINESS/content/live/TECHNICAL_SOLUTION/35000/TECH35035/en_US/272425.pdf on May 30, 2012. 27 pages.
VERITAS™ Insight™ 7.1 User's Guide. 2004. pp. 1-170.
VERITAS Indepth™ for Microsoft .NET User's guide for Window 2005. 7.1 pp. 1-102.

\* cited by examiner

*Primary Examiner* — Anna Deng
(74) *Attorney, Agent, or Firm* — Dorsey & Whitney LLP (57) ABSTRACT

Methods, systems, and computer code for (i) performance-monitoring a multi-tier application including a .NET tier and a database tier; and (ii) for visually presenting performance-data to a user are disclosed. In some embodiments, a multi-tiered performance data interface, for example, including a .NET tier performance data interface and a database tier performance data interface operatively coupled to the .NET tier performance data interface, is provided. In some embodiments, the .NET tier performance data interface is configured to present .NET stack data and the database performance data interface is configured to present internal database performance data, for example, wait times (e.g. relative magnitudes of different types of wait times). Techniques for matching .NET-tier requests to execute SQL statements with database-tier executions of SQL statements are also disclosed.

19 Claims, 8 Drawing Sheets

BINDING BETWEEN NET TECHNOLOGIES AND SQL SERVER STATEMENTS

BACKGROUND OF THE INVENTION

1. Field of the Invention

The present invention relates to techniques for performance-monitoring multi-tier applications including a .NET tier and a database tier and for presenting performance data to a user.

2. Related Art

In the information technology (IT) departments of modern organizations, one of the biggest challenges is meeting the increasingly demanding service levels required by users. With more and more application directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however the source of performance problems is often unclear. Consequently, application performance problems can be difficult to detect and correct. Furthermore, tracking application performance manually can be an expensive and labor-intensive task.

Automated tools for application performance management may assist in providing a consistently high level of performance and availability. These automated tools may result in lower costs per transaction while maximizing and leveraging the resources that have already been spent on the application delivery infrastructure.

Automated tools for application performance management may give finer control of applications to IT departments. Application performance management tools may enable IT departments to be proactive and fix application performance issues before the issues affect users. Historical performance data collected by these tools can be used for reports, trending analyses, and capacity planning. By correlating this collected information across application tiers, application performance management tools may provide actionable advice to help IT departments solve current and potential problems.

In a real-world environment, the performance of applications may be highly variable due to normal variations in resource usage over time. Furthermore, requirements such as user needs, usage patterns, customization requirements, system components, architectures, and platform environments may vary from business unit to business unit. These variations may also cause application performance to be highly variable. Tuning applications to work together efficiently and effectively in their unique environments can be crucial to reaching organizational goals and maintaining competitive advantages. Automated tools for application performance management can assist in these tuning operations.

Today, it is quite common to develop multi-tier applications that include a .NET tier and a database tier. For many performance problems, it is not clear if the culprit is in the .NET tier, the database tier or some combination of both tiers. There is an ongoing need for tools that can performance-monitor multi-tier applications, especially multi-tier applications that include a .NET tier and a database tier.

SUMMARY

It is now disclosed for the first time a data-presentation tool for presenting performance data of a multi-tier application including a .NET tier and a database tier. During runtime, performance data from both tiers is recorded, including .NET SQL statement execution requests and database-tier SQL statement executions. Upon matching between a given .NET SQL statement execution request and a corresponding database-tier statement execution, it is possible to present, to a user, a multi-tier performance-data presentation interface including: (i) a representation of a multi-level .NET stack; and (ii) a description of internal database tier performance data of a given SQL statement invoked by a .NET method of the .NET stack. This internal database tier performance data may include, for example, magnitudes of various "wait types" (i.e. I/O wait, CPU wait, network wait, lock wait, etc) associated with execution of the "given" SQL statement.

In some embodiments, this 'unified' multi-tier performance-data interface is useful for multi-tiered application tuning—for example, by a user who is presented with a 'multi-tier' view of application performance. This may allow, for example, a user to tune a .NET method or code module by receiving meaningful information about how to tune a database statement which is invoked by the .NET method.

In one example, a user wishes to determine why performance of a given .NET method is unacceptably slow. In this example, the user is presented with a visual representation of a multi-level .NET call stack including respective execution times of each level of the call stack, where a given method in the call stack invokes the SQL statement. In this example, internal database-tier performance data (for example, relative consumption data for different types of database resources) is associated, within the "multi-tier performance data interface", with the .NET method that invokes the SQL statement.

In one specific implementation, the association between the invoking .NET method and the database-tier internal performance data may be visual—for example, the internal database-tier performance data of the invoked SQL statement may be connected via a line with the .NET method that invokes the SQL statement, or via some color coding scheme. This is one example of an 'operative coupling" between a .NET performance data interface and a database tier performance data interface.

Alternatively or additionally, in another implementation, it may be possible to launch the database tier interface with a user engagement of a given .NET method or database statement associated with a given .NET method. In yet another example, it is possible to configure the database performance data interface by graphically engaging an element of the .NET stack.

It is now disclosed for the first time a system for presenting performance data of a multi-tier application having a .NET tier and a database tier. The disclosed system comprises: a) a .NET probe operative to log .NET performance data of the .NET tier; b) a database-tier probe operative to log internal database performance data of the database tier; and c) a multi-tier performance-data presentation interface comprising: i) a .NET tier interface configured to present, in accordance with the logged .NET performance data, a representation of a multi-level .NET stack of the .NET tier; and ii) a database-tier interface that is operatively coupled to the .NET tier interface and configured to present a description of the logged internal performance data for a given SQL statement invoked from a statement-invoking method of the .NET stack.

According to some embodiments, the database-tier interface is configurable by a user engagement of a graphical element of the multi-level .NET stack representation such that the given SQL statement is selected in accordance with the user engagement.

According to some embodiments, the .NET tier interface is configured to receive a user selection of the statement-invoking method from a plurality of .NET methods of the multi-level .NET stack.

According to some embodiments, i) the database-tier interface resides on a host screen different from a host screen of the .NET tier interface; and ii) the .NET tier interface is operative, upon receipt of a user launch directive, to launch the database-tier interface.

According to some embodiments, the database-tier interface is activatable by a user engagement of a graphical element of the multi-level .NET stack representation.

According to some embodiments, the database-tier interface is configured such that the description of the logged internal database performance data comprises an indication of a magnitude at least one wait time selected from the group consisting of" i) CPU wait; ii) I/O wait; iii) lock wait; iv) remote wait; v) CLR Wait; vi) internal wait; vii) Log Wait; viii) internal wait; ix) TempDB Wait; x) Parallel Exchange Wait; and xi) Request Wait.

According to some embodiments, the system further comprises: d) a wait-time comparison element for determining a more dominant wait time from a plurality of the wait times, and the description of the logged internal database performance data comprises an indication of the more dominant wait time.

According to some embodiments, the database-tier interface is configured such that the description of the logged internal database performance data comprises indications of relative magnitudes at least two wait times selected from the group consisting of" i) CPU wait; ii) I/O wait; iii) lock wait; iv) remote wait; v) CLR Wait; vi) internal wait; vii) Log Wait; viii) internal wait; ix) TempDB Wait; x) Parallel Exchange Wait; and xi) Request Wait.

According to some embodiments, the database-tier interface is configured to present an indication of locking state data of the given SQL statement.

According to some embodiments, the .NET tier interface is operative to display, for each given .NET method in the multi-level .NET stack, at least one of: i) a respective service time of the given .NET method; and ii) a respective work time of the given .NET method.

According to some embodiments, the .NET tier interface is operative to display, for each given .NET method in the multi-level .NET stack, a respective number of invocations during a given plural-invocation time period such that different invocations numbers are displayed for different levels of the .NET stack.

It is now disclosed for the first time a method for presenting performance data of a multi-tier application having a .NET tier and a database tier, the system comprising: a) logging .NET performance data of the .NET tier; b) logging internal database performance data of the database tier; and c) presenting, to a user, a representation of a multi-level .NET stack of the .NET tier; and d) in accordance with a user engagement of a visual element of the multi-level .NET stack of the .NET tier, presenting a description of the logged internal data performance data for a given SQL statement invoked from a statement-invoking method of the .NET stack.

It is now disclosed for the first time a method of performance-monitoring a multi-tier application having a .NET tier and a database tier, the method comprising: a) monitoring the .NET tier of the multi-tier application to log SQL statement string data and target database server identifiers of SQL statement execution-requests; b) monitoring the database tier of the multi-tier application to log SQL statement string data and target database server identifiers of SQL statement executions; and c) determining invocation relationships between individual SQL statement execution-requests of the .NET tier and individual SQL statement-executions of the database tier by matching the logged .NET tier statement string data and target server identifiers with the logged database tier statement string data and target server identifiers.

According to some embodiments, i) at least one of the logging and the matching comprises parsing the .NET-side statement string data to detect at least one data element selected from the group consisting of: A) SQL parameter value data; B) stored procedure instructions; C) constant value data; within the parsed .NET-side statement string data; and ii) the matching is carried out in a manner that it insensitive to the detected data element.

According to some embodiments, i) at least one of the logging and the matching comprises parsing the database-side statement string data to detect at least one data element selected from the group consisting of. A) SQL parameter value data; B) stored procedure instructions; C) constant value data; within the parsed database-side statement string data; and ii) the matching is carried out in a manner that it insensitive to the detected data element.

It is now disclosed for the first time a system for performance-monitoring a multi-tier application having a .NET tier and a database tier, the system comprising: a) a .NET tier probe configured to log SQL statement string data and target database server identifiers of SQL statement execution-requests; b) a database tier probe configured to log SQL statement string data and target database server identifiers of SQL statement executions; and c) an invocation relationship detector operative to determine invocation relationships between individual SQL statement execution-requests of the .NET tier and individual SQL statement-executions of the database tier by matching the logged .NET tier statement string data and target server identifiers with the logged databasetier statement string data and target server identifiers.

These and further embodiments will be apparent from the detailed description and examples that follow.

BRIEF DESCRIPTION OF THE DRAWINGS

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to'), rather than the mandatory sense (i.e. meaning "must").

DETAILED DESCRIPTION OF EMBODIMENTS

Figure 1:
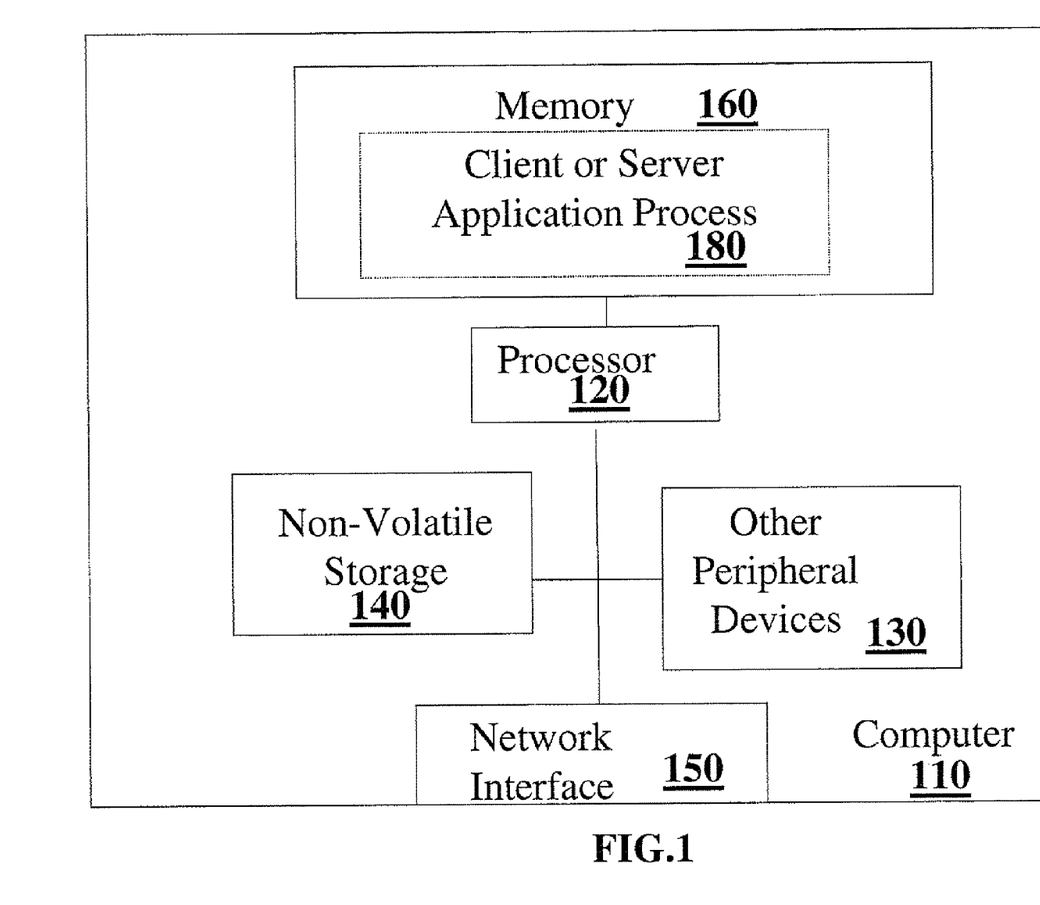
FIG. 1 provides a block diagram of an exemplary computer.

The present invention will now be described in terms of specific, example embodiments. It is to be understood that the invention is not limited to the example embodiments disclosed. It should also be understood that not every feature of the presently disclosed system, method and computer-readable code for identifying a presence or absence of activator-activated relationships is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first. The general principles described herein may be applied to other embodiments and applications without departing from the scope of the invention. Thus, the present invention is not to be limited to the embodiments shown, but is to be accorded the widest scope consistent with the principles and features described herein FIG. 1 illustrates one embodiment of a computer 110 including a processor 120. Processor 120 is shown coupled to a memory 160, a non-volatile storage 140, other peripheral devices (e.g. keyboard, display, mouse) and a network interface 150 such as a network interface card.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM® for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In different embodiments, computer 110 may be configured as a client system (for example, a client system hosting a web browser or another web client) or as a server system.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160. As shown in FIG. 1, a client or server application process resides in the memory 160.

Software modules that may be executed by processor 120 may include, in one embodiment, client/server software such as a web server or a web browser. Alternatively, or in addition, processor 120 may execute software modules comprising proxy server, network management software, office productivity tools, e-mail programs, etc.

Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160.

As shown in FIG. 1, a client or server application process 180 to be performance-monitored resides in memory 160. In one embodiment, one or more software processes may perform the function of profiling other software processes (e.g. process 180) during operation, gathering and storing data indicative of the operation of one or more of the other software processes. The performance-monitored software application may reside on computer 110. Alternatively or additionally, the performance-monitored software application may reside on a different computer. These monitored application (i.e. database management system) may reside on a single computer 110 or may be a distributed or clustered application residing on a plurality of computers 110.

Figure 2A:
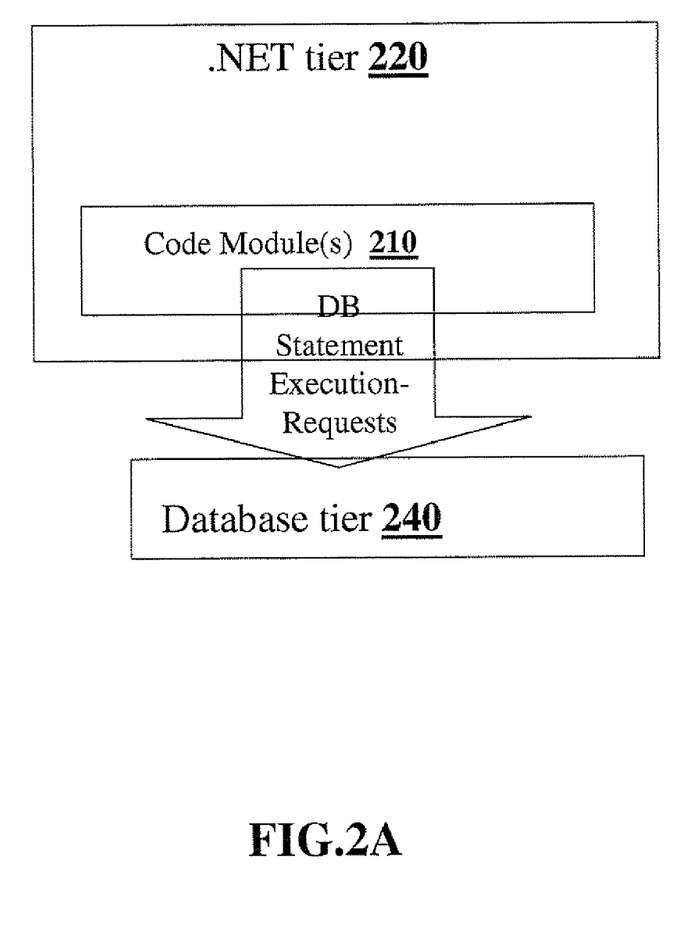
FIG. 2A provides a diagram of an exemplary multi-tier application where a given code module of a .NET tier sends request(s) to a database tier to execute SQL statement(s).

FIG. 2A provides a diagram of an exemplary multi-tier application where a given code module of a .NET tier sends request(s) to a database tier to execute SQL statement(s). In the example of FIG. 2A, a code module or modules 210 of the .NET tier sends DB statement execution-requests to a database tier 240. In different embodiments, the .NET tier may reside on a single machine or plurality of machines. Similarly, the database tier may reside on a single machine or plurality machines. In one example, the various machines are in communication with each other via a local area network (not shown).

Typically, the database tier includes a relational database, for example, SQL Server®, Oracle®, Sybase®, IBM DB2®, MySql®, or any other relational database that can execute SQL statements.

Figure 2B:
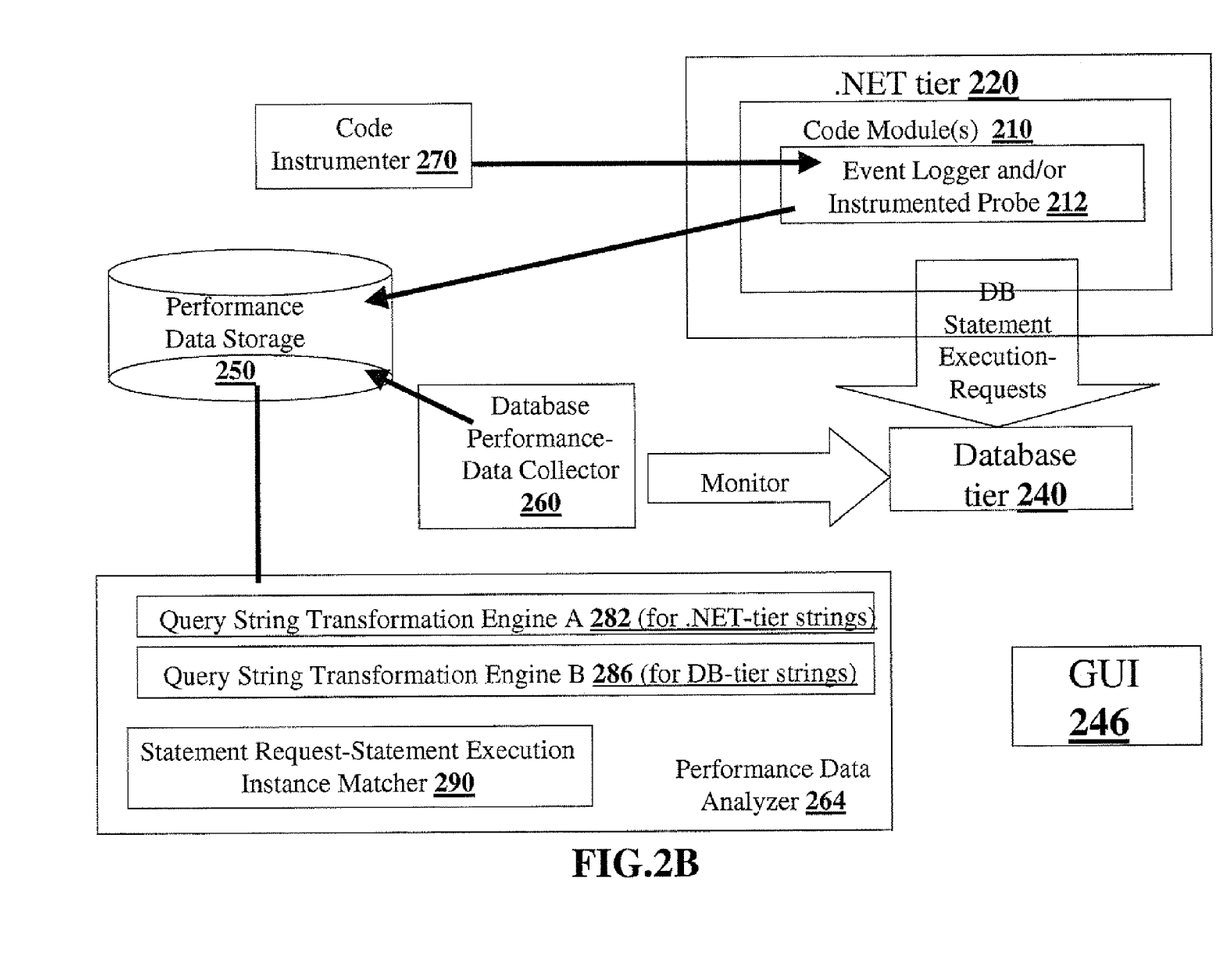
FIG. 2B provides a diagram of an exemplary system including a multi-tier application and performance-monitoring components including probing components, analytical components and a performance-data display user interface.

FIG. 2B provides a diagram of an exemplary system including a multi-tier application and performance-monitoring components including probing components, analytical components and a performance-data display user interface.

In the example of FIG. 2B, an event logger or .NET probe 212 (for example, instrumented into code module(s) 210 by code instrumenter 270) detects performance data from the .NET tier 220 and logs this performance data storage 250. In one example, this performance data may include indications of requests to executed SQL statements, service times or wait times of various functions, a structure of the .NET stack, times that various methods are executed, times that a request to execute an SQL statement is send, and other data associated with a request to execute an SQL statement—for example, an identifier identifying a target database server. In one implementation, this identifier is provided as part of a so-called connection string.

The system of FIG. 2B further includes a database performance-data collector 260 which monitors the database tier 240 (for example, by periodically querying system tables or using an API to periodically read system data). The detected database tier 240 performance data is logged into performance data storage 250.

It is noted that any component of the system of FIG. 2B, or any system disclosed herein, may be implemented in any combination of software and hardware. Furthermore, it is noted that performance data storage 250 may be implemented in any combination of volatile and non-volatile memory, may be centralized in a single machine or reside on a number of machines.

The system of FIG. 2B also includes a performance data analyzer 264. The performance data analyzer 264 may be operative to match respective .NET-tier SQL statement execution requests (i.e. detected by probe 212) with a corresponding database-tier SQL statement executions. (i.e. detected by database-tier probe/database performance data collector 260). Indeed, it is indeed surprising that, despite the discrepancies between the string formats in the different tiers, it is possible (i) to transform the .NET-tier (i.e. by String Transformation Engine A 282) and database-tier SQL statement string data (i.e. by String Transformation Engine B 286) into a common format and (ii) to match (i.e. by matcher 290) the transformed .NET-tier SQL statement execution request data with the transformed database-tier SQL statement execution data. An exemplary technique for doing this is described in FIG. 3.

As illustrated in FIG. 2B, the system also includes a GUI 246 for displaying performance data to a user.

Figure 3:
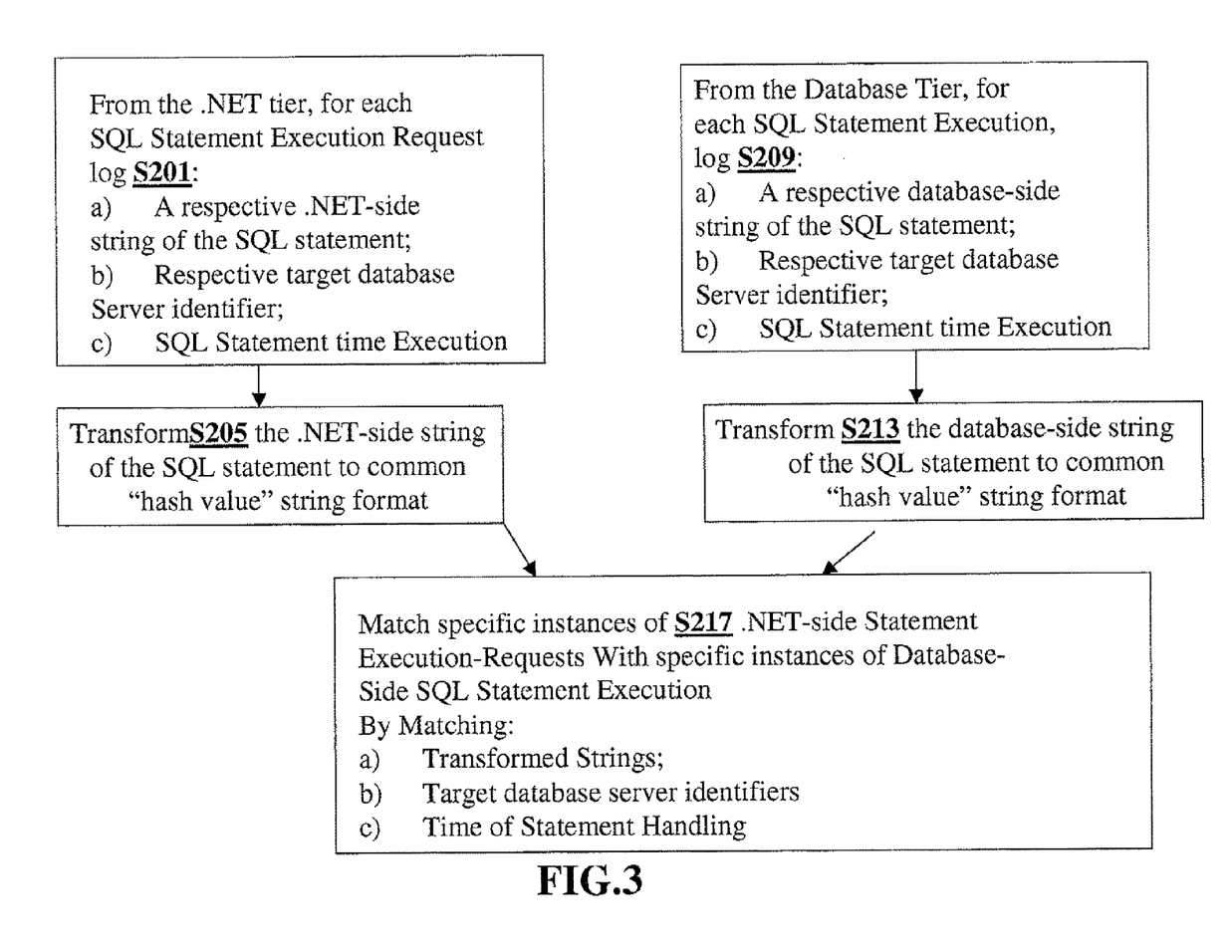
FIG. 3 provides a flow diagram of an exemplary technique for matching individual instances of SQL statement execution requests generated by the .NET tier with respective SQL statement executions of the database tier.

FIG. 3 provides a flow diagram of an exemplary technique for matching individual instances of SQL statement execution requests generated by the .NET tier with respective SQL statement executions of the database tier. In step S201, .NET-tier performance data is logged by .NET probe 212. In step S209, database-tier performance data is logged by .NET probe 212.

The SQL statement data is transformed (i.e. by engines 282 and 286) in steps S205 and S213. An exemplary implementation is discussed towards the end of this disclosure, in Examples 1-13. In step S217, the data is matched. The matching includes matching transformed strings, matching the database server identifier, and matching the time that the execution request is provided with the time that the statement is executed.

In some embodiments, the matching is useful to associate a "host .NET method" of given SQL statement execution request (i.e. a .NET method from which a SQL statement execution request is issued) with a given SQL statement execution. This may be useful for associating .NET performance data with database tier performance data.

Figure 4:
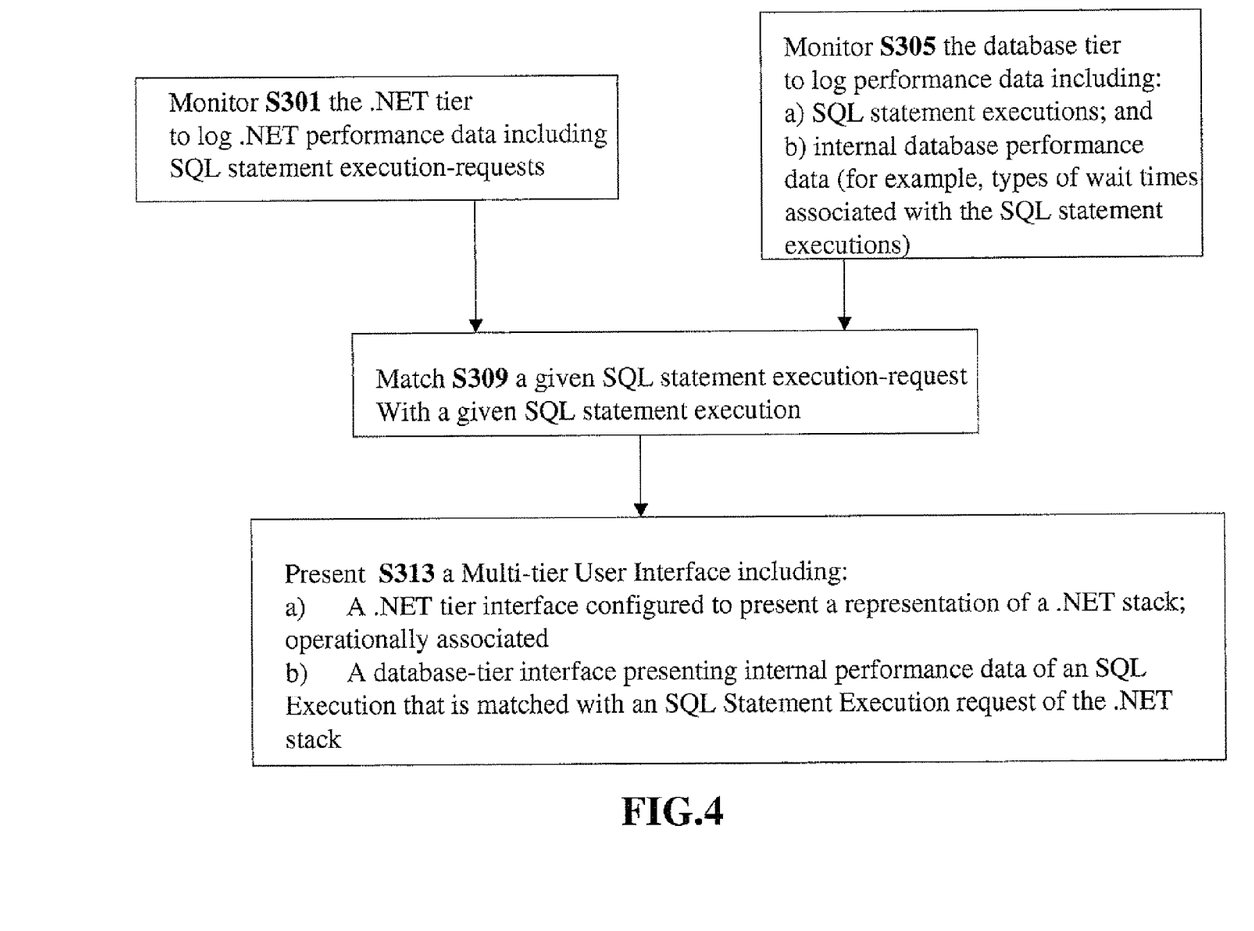
FIG. 4 provides a flow diagram of an exemplary technique for performance-monitoring a multi-tier applications and presenting the performance data to a user in a multi-tier user interface.

FIG. 4 provides a flow diagram of an exemplary technique for performance-monitoring a multi-tier applications and presenting the performance data to a user in a multi-tier user interface including a .NET tier interface for presenting .NET tier performance data and a database-tier interface for presenting database tier performance data.

Thus, in step S301, the .NET tier is monitored (for example, by probe 212) to log .NET performance data including SQL statement execution requests. In S305, the database tier is monitored (for example, by database tier probe 260) to log SQL statement executions and internal database performance data (i.e. performance parameters measuring how a given SQL statement is executed within the database tier—for example, magnitudes of types of wait times or magnitudes of resource consumption within the database tier) of the SQL statement executions.

In step S309, the SQL statement execution request are associated with the SQL statement executions. In statement 5313, a multi-tier performance-data presentation interface is presented to a user. This multi-tier performance-data presentation interface includes: (a) a .NET tier interface (i.e. for presenting .NET tier performance data and for receiving user actions related to the .NET tier performance data); and (b) a database tier interface that is operatively coupled to the .NET tier interface—i.e. user actions to the .NET tier interface are operative to configure the database performance interface.

Figure 5A:
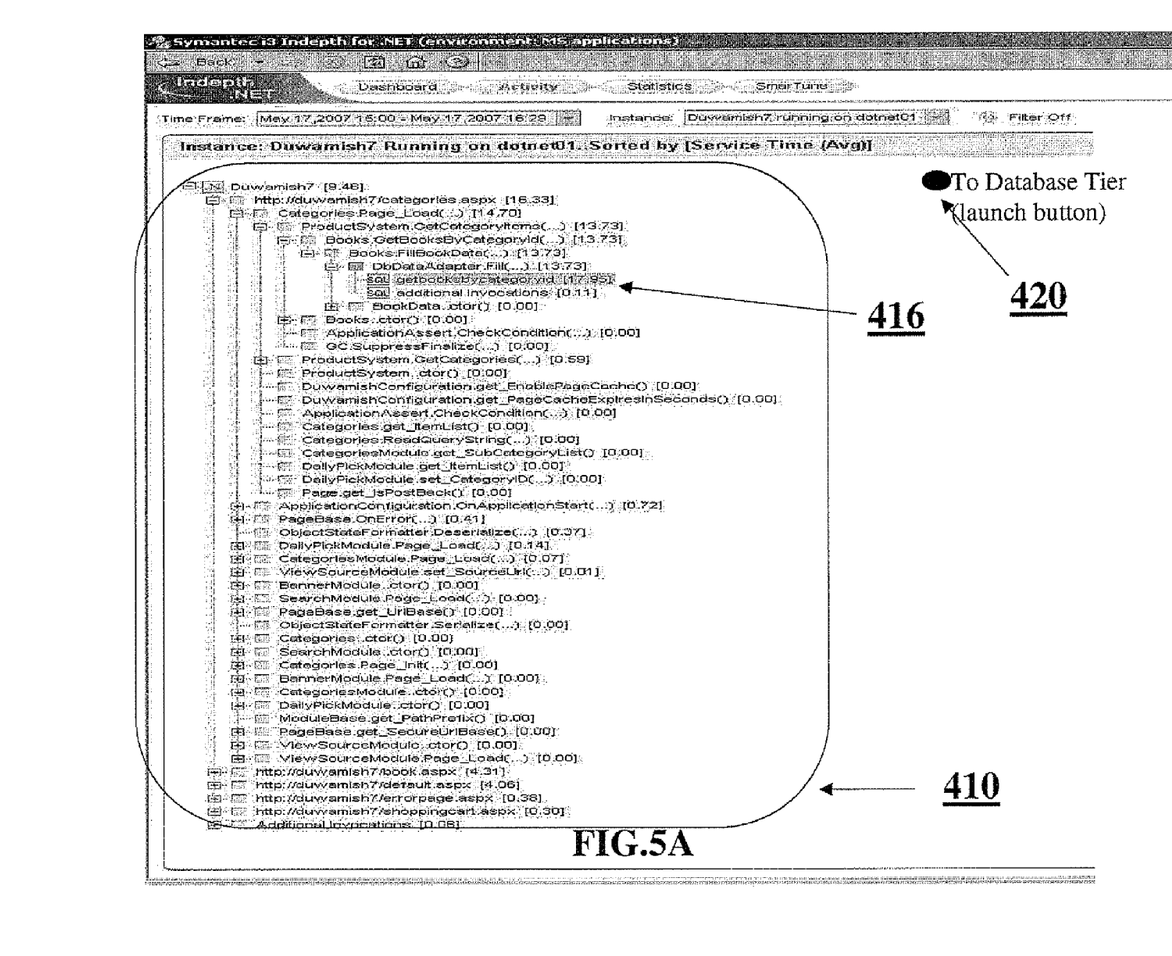
FIG. 5A provides an image of an exemplary .NET tier interface for presenting performance data including a .NET stack.
Figure 5B:
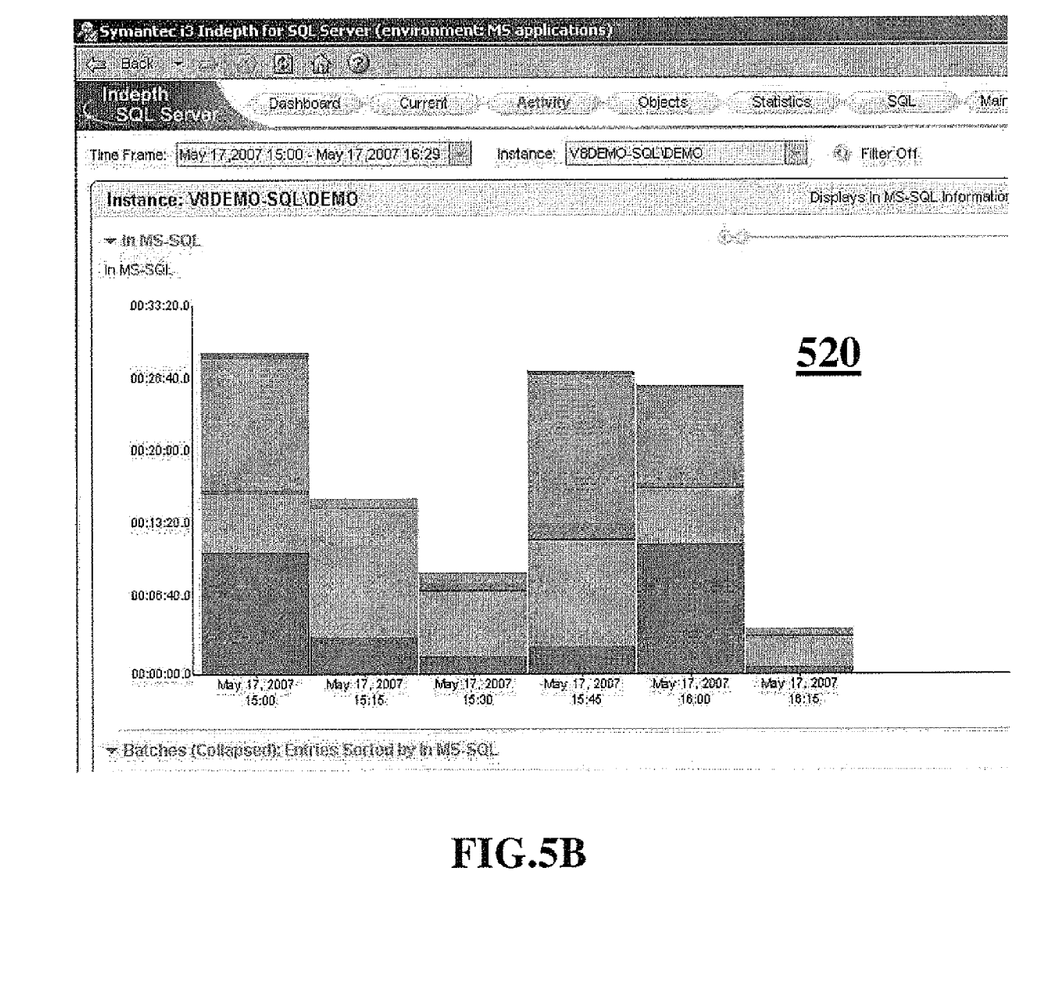
FIG. 5B provides an image of an exemplary database tier interface for presenting performance data including a .NET stack.

In the example of FIGS. 5A-5B, the .NET performance interface 410 is operative to receive a user specification of a .NET method of a .NET stack—in this case, the .NET method selected is DbDataAdapater.Fill( . . . ). This user specification (which may be provided, for example by a user engagement of a visual element representing the .NET method) is operative to configure the database-tier interface (see FIG. 5B) to display data for an SQL statement execution request (i.e. represented by 416) issued by the .NET method (i.e. by a line or lines of code within the method).

Thus, by selecting this .NET method, the database interface is operative to present internal performance data for an SQL statement of the selected .NET method (in this case getbokosbycategoryid). In the example of FIG. 5A, .NET tier performance data is also displayed. In this case, this includes service times of the various methods.

Upon using the .NET interface to select what type of data will be displayed by the internal database interface, it is possible to launch (i.e. using launch button 420) the database interface.

In the example of FIG. 5B, the internal performance data is shown in a bar graph, where each "layer" of a given bar is coded to display a magnitude of a wait time (for example, total CPU wait time, I/O wait time, CLR wait times, etc). associated with executing a given SQL statement. As noted earlier, the SQL statement is selected, at least in part, by a "user engagement" of the .NET tier performance data presentation interface 410. In this way, .NET interface 410 is operative to receive a user directive which "configures" the database-tier performance interface. This is useful for multi-tier tuning of the application.

Figure 6:
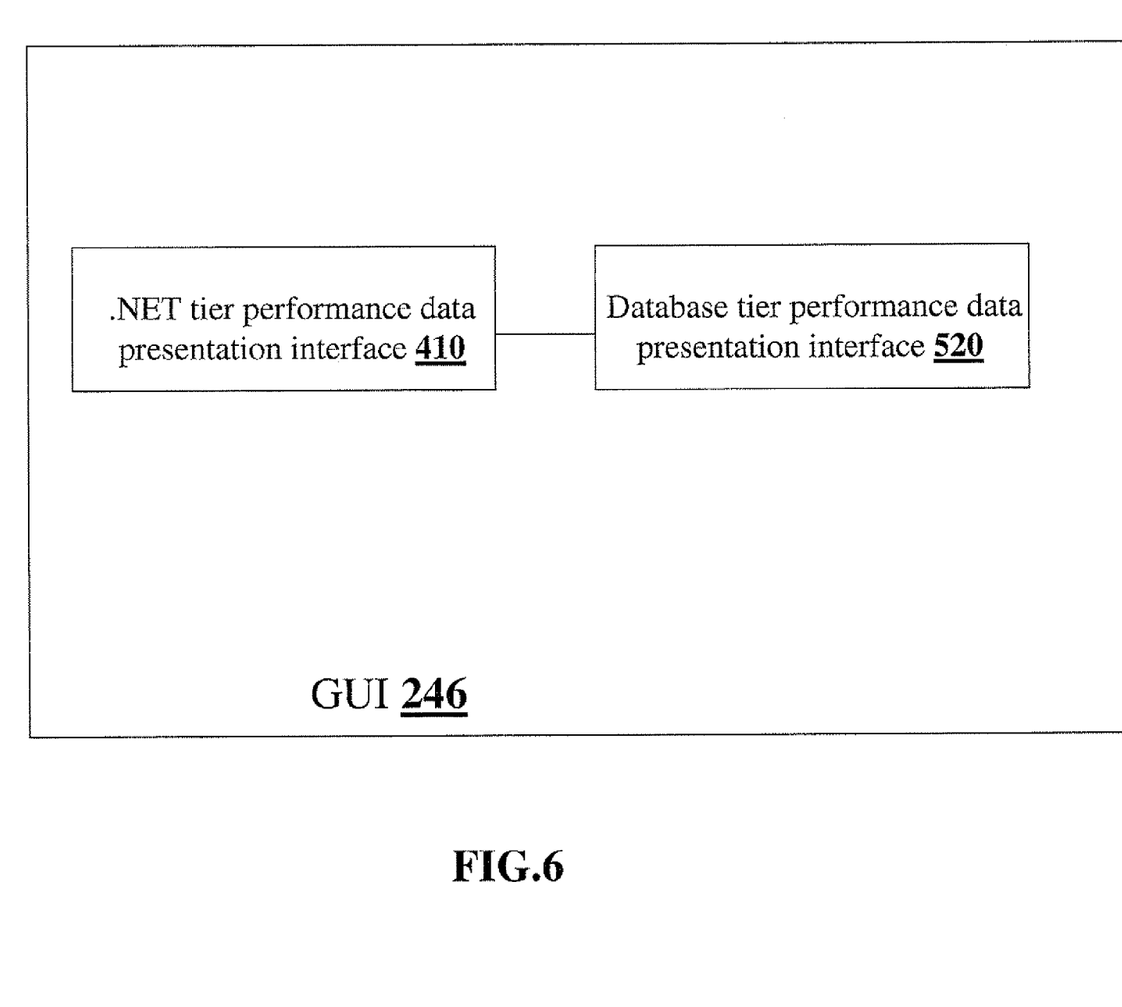
FIG. 6 provides a block diagram of components of an exemplary multi-tier performance-data presentation interface.

FIG. 6 provides a block diagram of components of an exemplary multi-tier performance-data presentation interface, including the database tier performance data interface 520 which is operatively coupled to the .NET tier performance data presentation interface 510.

The following examples are to be considered merely as illustrative and non-limiting in nature. It will be apparent to one skilled in the art to which the present invention pertains that many modifications, permutations, and variations may be made without departing from the scope of the invention.

EXAMPLES

Example 1

An Exemplary Implementation of S201 and S213

For examples 1-13, we relate specifically to the case of Microsoft SQL Server®.

According to this example, the parsing of the input text includes the following steps:
  Remove all remarks that are in the statement (i.e. the text that starts with "/*" and end with "*/" or text that starts with "--" and ends with LF)
  If the statement starts with a "(@"
    Ignore the parenthesis and the text in it
  If the statement does not starts with a "(@"
    If the statement starts with the string "CREATE PROCEDURE"
      Or the statement starts with the string "CREATE PROC"
      Or the statement starts with the word "EXEC" or "EXECUTE"
      Or the statement starts with a non-reserved word
        Remove the database and the owner names
        Return the stored procedure name hash value without the parameters
  Remove from the text all places where there are strings; starts with (') and ends with (').
  Remove from the text all places where there are numbers
  Remove from the text all places where there are question marks "?"
  Remove from the text all places where there are "@" and the name of the parameter afterwards
  If a character Hex is less than 20 (space) except for Hex 0A (LF)
    Replace it to 20
  Remove spaces excepts for spaces between "[" and "]"
  Remove "[" and "]"
  Start from the end,
    if its Hex is less than 21
      Ignore this character Example 2

A List of SOL Words that Start a Command for the Specific Case of Microsoft SQL Server®

ALTER BEGIN BEGINTRAN BREAKBACKUP
CALL CHECKPOINT CLOSE COMMIT CONTINUE CREATE
DBCC DEALLOCATE DECLARE DELETE DENY DROP
ELSE END EXEC EXECUTE FETCH GO GOTO GRANT
IF INSERT KILL OPEN PRINT RAISERROR READTEXT
RECONFIGURE RESTORE RETURN REVERSE ROLLBACK
SAVE SELECT SET SHUTDOWN TRUNCATE UPDATE UPDATETEXT
USE WAITFOR WITH WHILE WRITETEXT ADD BULK DISABLE
DUMP ENABLE FOR GET KILL MOVE RECEIVE REVERT REVOKE
SEND TRY WRITETEXT

Example 3

A List of Characters that Come Before a Number for the Specific Case of Microsoft SQL Server®

CR/LF
Space
%
(
*
/
+
-
%
<
>
=
,
;

Example 4

A List of Characters that Come after a Number for the Specific Case of Microsoft SQL Server®

CR/LF
Space
%
)
*
/
+
-
%
<
>
=
,
;
!
}

Example 5

A List of Characters that Come after a Parameter for the Specific Case of Microsoft SQL Server®

CR/LF
Space
%
)
*
/
+
-
%
<
>
=
,
;
!
}

Example 6

An First Exemplary .NET Statement Detected by Probe 212

The "raw" .NET statement is:
SELECT SUM(OC) FROM INVOICES WHERE COUNTRY<>'UK'
  SELECTSUM(OC)FROMINVOICESWHERECOUNTRY<>

The "formatted" statement after transformation S205 is:
SELECTSUM(OC)FROMINVOICESWHERECOUNTRY<>

Example 7

An First Exemplary Database-Tier-Side Statement Detected by Probe/Data Collector 260

The "raw" database-tier statement is:
(@1 VARCHAR(8000))SELECT SUM(OC) FROM [INVOICES] WHERE [COUNTRY]<>@1
SELECTSUM(OC)FROMINVOICESWHERECOUNTRY<>
The "formatted" statement after transformation S213 is:
SELECTSUM(OC)FROMINVOICESWHERECOUNTRY<>

Example 8

A Second Exemplary .NET Statement Detected by Probe 212

The "raw" .NET statement is:
UPDATE AGENTS SET PARAMVALUE='NO' WHERE MACHINE='QT_W' AND AGENTTYPE=? AND PARAMNAME='LASTACTION'
The "formatted" statement after transformation S205 is:
UPDATEAGENTSSETPARAMVALUE=WHERE MACHINE=ANDAGENTTYPE=ANDPAR AMNAME=

Example 9

A Second Exemplary Database-Tier-Side Statement Detected by Probe/Data Collector 260

The "raw" database-tier statement is:
(@P1 INT)UPDATE AGENTS SET PARAMVALUE='NO' WHERE MACHINE='QT_W' AND AGENTTYPE=@P1 AND PARAMNAME='LASTACTION'
The "formatted" statement after transformation S213 is:
UPDATEAGENTSSETPARAMVALUE=WHERE MACHINE=ANDAGENTTYPE=ANDPAR AMNAME=

Example 10

A Third Exemplary .NET Statement Detected by Probe 212

The "raw" .NET statement is:
SELECT RC, OC, ORDER_DATE FROM INVOICES WHERE CUSTOMERID=20008 AND CUST_TYPE=!=30/*30–MLB*/AND (COUNTRY='UK' OR COUNTRY='USA') AND ORDERID=@P1 AND OC>0 ORDER BY 2
The "formatted" statement after transformation S205 is:
SELECTRC,OC,ORDER_DATEFROMINVOICES WHERECUSTOMERID=ANDCUST_TYPE!=/AND (COUNTRY=ORCOUNTRY=) ANDORDERID=ANDOC>ORDERBY Example 11

A Third Exemplary Database-Tier-Side Statement Detected by Probe/Data Collector 260

The "raw" database-tier statement is:
(@P1 INT)SELECT RC, OC, ORDER_DATE FROM INVOICES WHERE CUSTOMERID=20008 AND CUST_TYPE!=30/*30–MLB*/AND (COUNTRY='UK' OR COUNTRY='USA') AND ORDERID=@P1 AND OC>0 ORDER BY 2 The "formatted" statement after transformation S213 is:
SELECTRC,OC,ORDER_DATEFROMINVOICES WHERECUSTOMERID=ANDCUST_TYPE!=/AND (COUNTRY=ORCOUNTRY=) ANDORDERID=ANDOC>ORDERBY Example 12

A Fourth Exemplary .NET Statement Detected by Probe 212

The "raw" .NET statement is:
[dbo].[MLB_GETLASTUSERINFO]
The "formatted" statement after transformation S205 is:
MLB_GETLASTUSERINFO Example 13

A Fourth Exemplary Database-Tier-Side Statement Detected by Probe/Data Collector 260

The "raw" database-tier statement is:
CREATE PROCEDURE [dbo].[MLB_GETLASTUSERINFO] @MLBID int AS SET NOCOUNT ON IF @MLBID>0 BEGIN SELECT TOP 1 LINK, USERID FROM dbo.MLBTIME WITH(NOLOCK) WHERE ID=@MLBIDEND The "formatted" statement after transformation S213 is:
MLB_GETLASTUSERINFO It is noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably, with the phrase "such as but not limited to".

The present invention has been described using detailed descriptions of embodiments hereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A system including a processor for presenting performance data of a multi-tier application having a .NET tier and a database tier, the system comprising:
   a) a .NET probe operative to log .NET performance data of the .NET tier;
   b) a database-tier probe operative to log internal database performance data of the database tier; and
   c) a multi-tier performance-data presentation interface comprising:
      i) a .NET tier interface configured to present, in accordance with the logged .NET performance data, a representation of a multi-level .NET stack of the .NET tier, and the .NET tier interface is operative to display, for each given .NET method in the multi-level .NET stack, a respective number of invocations during a given plural-invocation time period such that different invocations numbers are displayed for different levels of the .NET stack;
      ii) a database-tier interface that is operatively coupled to the .NET tier interface and configured to present a description of the logged internal performance data for a given SQL statement invoked from a statement-invoking method of the .NET stack; and
      iii) a matching element operative to match said logged .NET performance data and said logged internal performance data of the database tier;
   wherein said .NET interface and said database-tier interface collectively present, to a user, information responsive to said matching element to match said logged .NET performance data and said logged internal performance data.

2. The system of claim 1 wherein the database-tier interface is configurable by a user engagement of a graphical element of the multi-level .NET stack representation such that the given SQL statement is selected in accordance with the user engagement.

3. The system of claim 1 wherein the .NET tier interface is configured to receive a user selection of the statement-invoking method from a plurality of .NET methods of the multi-level .NET stack.

4. The system of claim 1 wherein:
   i) the database-tier interface resides on a host screen different from a host screen of the .NET tier interface; and
   ii) the .NET tier interface is operative, upon receipt of a user launch directive, to launch the database-tier interface.

5. The system of claim 1 wherein the database-tier interface is activatable by a user engagement of a graphical element of the multi-level .NET stack representation.

6. The system of claim 1 wherein the database-tier interface is configured such that the description of the logged internal database performance data comprises an indication of a magnitude at least one wait time selected from the group consisting of:
   i) CPU wait;
   ii) I/O wait;
   iii) lock wait;
   iv) remote wait;
   v) CLR Wait;
   vi) internal wait;
   vii) Log Wait;
   viii) internal wait;
   ix) TempDB Wait;
   x) Parallel Exchange Wait; and
   xi) Request Wait.

7. The system of claim 6 further comprising:
   d) a wait-time comparison element for determining a more dominant wait time from a plurality of the wait times, and wherein the description of the logged internal database performance data comprises an indication of the more dominant wait time.

8. The system of claim 1 wherein the database-tier interface is configured such that the description of the logged internal database performance data comprises indications of relative magnitudes at least two wait times selected from the group consisting of:
   i) CPU wait;
   ii) I/O wait;
   iii) lock wait;
   iv) remote wait;
   v) CLR Wait;
   vi) internal wait;
   vii) Log Wait;
   viii) internal wait;
   ix) TempDB Wait;
   x) Parallel Exchange Wait; and
   xi) Request Wait.

9. The system of claim 1 wherein the database-tier interface is configured to present an indication of locking state data of the given SQL statement.

10. The system of claim 1 wherein the .NET tier interface is operative to display, for each given .NET method in the multi-level .NET stack, at least one of:
    i) a respective service time of the given .NET method; and
    ii) a respective work time of the given .NET method.

11. A method for presenting performance data of a multi-tier application having a .NET tier and a database tier, the method comprising:
    a) logging .NET performance data of the .NET tier;
    b) logging internal database performance data of the database tier;
    c) presenting, to a user, a representation of a multi-level .NET stack of the .NET tier;
    d) in accordance with a user engagement of a visual element of the multi-level .NET stack of the .NET tier, presenting a description of the logged internal data performance data for a given SQL statement invoked from a statement-invoking method of the .NET stack;
    e) displaying, for each given .NET method in the multi-level .NET stack, a respective number of invocations during a given plural-invocation time period such that different invocations numbers are displayed for different levels of the .NET stack; and
    f) matching said logged .NET performance data and said internal performance data of the database tier;
   wherein said steps of presenting a representation of a multi-level .NET stack and said steps of presenting a description of the logged internal performance data collectively include steps of presenting, to a user, information responsive to said steps of matching said logged .NET performance data and said internal performance data.

12. A system, for presenting performance data of a multi-tier application having a .NET tier and a database tier, the system comprising:
   a) means for logging .NET performance data of the .NET tier;

b) means for logging internal database performance data of the database tier; and
c) means for presenting, to a user, a representation of a multi-level .NET stack of the .NET tier;
d) means for presenting, in accordance with a user engagement of a visual element of the multi-level .NET stack of the .NET tier, a description of the logged internal performance data for a given SQL statement invoked from a statement-invoking method of the .NET stack;
e) means for displaying, for each given .NET method in the multi-level .NET stack, a respective number of invocations during a given plural-invocation time period such that different invocations numbers are displayed for different levels of the .NET stack; and
f) means for matching said logged .NET performance data and said internal performance data of the database tier;
wherein said means for presenting a representation of a multi-level .NET stack and said means for presenting a description of the logged internal performance data collectively include means for presenting, to a user, information responsive to said means for matching said logged .NET performance data and said internal performance data.

13. A non-transitory computer readable medium comprising program instructions executable by a computing device, wherein when executed the program instructions are operable to:
a) log .NET performance data of the .NET tier;
b) log internal database performance data of the database tier;
c) present, to a user, a representation of a multi-level .NET stack of the .NET tier;
d) in accordance with a user engagement of a visual element of the multi-level .NET stack of the .NET tier, present a description of the logged internal data performance data for a given SQL statement invoked from a statement-invoking method of the .NET stack;
e) display, for each given .NET method in the multi-level .NET stack, a respective number of invocations during a given plural-invocation time period such that different invocations numbers are displayed for different levels of the .NET stack; and
f) match said logged .NET performance data and said internal performance data of the database tier;
wherein said instructions to present a representation of a multi-level .NET stack and said instructions to present a description of the logged internal performance data collectively include instructions to present, to a user, information responsive to instructions to match said logged .NET performance data and said internal performance data.

14. A method of performance-monitoring a multi-tier application having a .NET tier and a database tier, the method comprising:
a) monitoring the .NET tier of the multi-tier application to log SQL statement string data and target database server identifiers of SQL statement execution-requests, said steps of monitoring the .NET tier including steps of recording performance data of said .NET tier;
b) monitoring the database tier of the multi-tier application to log SQL statement string data and target database server identifiers of SQL statement executions, said steps of monitoring the database tier including steps of recording performance data of said database tier;
c) determining invocation relationships between individual SQL statement execution-requests of the .NET tier and individual SQL statement-executions of the database tier by matching the logged .NET tier statement string data and target server identifiers with the logged database tier statement string data and target server identifiers, said steps of determining including matching said performance data of the .NET tier with said performance data of the database tier; and
d) presenting, to a user, information responsive to said steps of matching said performance data of the .NET tier and said performance data of the database tier.

15. The method of claim 14 wherein:
i) at least one of the logging and the matching comprises parsing the .NET-side statement string data to detect at least one data element selected from the group consisting of:
A) SQL parameter value data;
B) stored procedure instructions;
C) constant value data;
within the parsed .NET-side statement string data; and
ii) the matching is carried out in a manner that it insensitive to the detected data element.

16. The method of claim 14 wherein:
i) at least one of the logging and the matching comprises parsing the database-side statement string data to detect at least one data element selected from the group consisting of:
A) SQL parameter value data;
B) stored procedure instructions;
C) constant value data;
within the parsed database-side statement string data; and
ii) the matching is carried out in a manner that it insensitive to the detected data element.

17. A system including a processor for performance-monitoring a multi-tier application having a .NET tier and a database tiers the system comprising:
a) a .NET tier probe configured to log SQL statement string data and target database server identifiers of SQL statement execution-requests, said .NET tier probe operative to log performance data;
b) a database tier probe configured to log SQL statement string data and target database server identifiers of SQL statement executions, said database tier probe operative to log performance data;
c) an invocation relationship detector operative to determine invocation relationships between individual SQL statement execution-requests of the .NET tier and individual SQL statement-executions of the database tier by matching the logged .NET tier statement string data and target server identifiers with the logged database tier statement string data and target server identifiers;
d) a matching element operative to match the performance data logged by said .NET tier probe and the performance data logged by said database tier probe; and
e) an interface operative to present, to a user, information responsive to said matching element.

18. A non-transitory computer readable medium comprising program instructions executable by a computing device, wherein when executed the program instructions are operable to:
a) monitor the .NET tier of the multi-tier application to log SQL statement string data and target database server identifiers of SQL statement execution-requests, said instructions to monitor the .NET tier including instructions operable to log performance data;
b) monitor the database tier of the multi-tier application to log SQL statement string data and target database server identifiers of SQL statement executions, said instructions to monitor the database tier including instructions operable to log performance data;

c) determine invocation relationships between individual SQL statement execution-requests of the .NET tier and individual SQL statement-executions of the database tier by matching the logged .NET tier statement string data and target server identifiers with the logged database tier statement string data and target server identifiers;
d) match the performance data logged by said .NET tier probe and the performance data logged by said database tire probe; and
e) present, to a user, information responsive to said matching element.

19. A system for performance-monitoring a multi-tier application having a .NET tier and a database tier, the system comprising:
a) means for monitoring the .NET tier of the multi-tier application to log SQL statement string data and target database server identifiers of SQL statement execution-requests;
b) means for monitoring the database tier of the multi-tier application to log SQL statement string data and target database server identifiers of SQL statement executions;
c) means for determining invocation relationships between individual SQL statement execution-requests of the .NET tier and individual SQL statement-executions of the database tier by matching the logged .NET tier statement string data and target server identifiers with the logged database tier statement string data and target server identifiers;
d) means for matching the performance data logged for the .NET tier and the performance data logged for the database tier; and
e) means for presenting, to a user information responsive to said means for matching.

\* \* \* \* \*